INVENTOR.
Jackson Bauer
BY
Paul & Paul
ATTORNEYS.

United States Patent Office 3,666,595
Patented May 30, 1972

3,666,595
METHOD FOR MANUFACTURE OF COMPACTED COMPOSITE FABRICS USING THERMOPLASTIC ADHESIVES
Jackson Bauer, Croydon, Pa., assignor to Collins and Aikman Corporation, New York, N.Y.
Filed Oct. 6, 1969, Ser. No. 863,966
Int. Cl. C09j 5/00
U.S. Cl. 156—324                                    9 Claims

ABSTRACT OF THE DISCLOSURE

Composite textile fabrics which are dimensionally stabilized to laundering and dry cleaning and a method for producing same are provided. In the process of the present invention, an uncompacted laminate is formed from at least one ply of a textile fabric, and one or more plies of either a textile fabric or a non-textile material such as a foam. The plies are bonded together with a hot melt adhesive which has a softening point above 160° F. and which is flowable and adhesive in a temperature range above 160° F. and below the softening or decomposition temperature of the materials comprising the plies. The laminate is then heated to the above temperature range and compacted an amount sufficient to compensate for at least a substantial portion of the inherent shrinkage of the uncompacted laminate. The compacted laminate is then cooled while in the compacted form. The hot melt adhesive solidifies and holds the composite textile fabric in the compacted dimensionally stabilized form.

BACKGROUND OF THE INVENTION

(1) Field of the invention

This invention is concerned with a composite textile fabric dimensionally stabilized as to laundering or dry cleaning shrinkage and a method for obtaining said fabric.

(2) Description of the prior art

Composite textile fabrics may be classified into two general classes, the bonded textile fabrics and the laminated textile fabrics. A bonded textile fabric is comprised of two or more plies of the same or different types of textile fabrics which are bonded directly to each other with a bonding agent which does not significantly add to the thickness. Laminated textile fabrics have a face ply of a textile fabric, and are bonded to a core ply of a continuous non-textile sheet material such as a foam, in a manner that the non-textile material does not lose its characteristic properties.

Composite textile fabrics have many unique properties which make them especially suitable for certain applications. An outer-wear fabric can be bonded to a lining fabric to form a self-lined bonded fabric which may be made directly into garments. Loose, open construction, sleazey fabrics, which in themselves are completely unsuitable for apparel use, may be bonded or laminated into a useful composite fabric. When a non-textile ply such as a urethane foam ply is bonded to a textile ply, a laminated textile fabric is obtained which is light in weight, but has excellent insulation properties and a full body.

Composite textile fabrics would be more widely employed, except that they have a very poor dimensional stability, especially when subjected to washing and dry cleaning. It is not uncommon for composite textile fabrics to shrink from 5 to 15%. Shrinkages of less than approximately 3% are required for commercially acceptable fabrics which are to be laundered or dry-cleaned. The use of the composite textile fabric is considerably restricted because of the inherent laundering or dry cleaning dimensional instability of the fabrics.

In addition to the problems of the overall shrinkage, a further problem is encountered in that materials which are employed to make the composite textile fabrics tend to shrink at different rates which causes a buckling or puckering of the fabrics.

Various methods have been suggested to overcome shrinkage of conventional single ply textile fabrics. One such method was to compact the fabrics. The methods for compacting conventional single ply textile fabrics are well known to those skilled in the art and are disclosed in patents such as in Walton, U.S. Pat. 2,765,513.

When it was attempted to compact the fully cured composite fabrics of the prior art, the composite fabrics tended to resist compaction. The bonding agents which were employed in the fully cured state tended to hold the plies in the uncompacted form in which they were cured. At best, only a slight amount of compaction is imparted to the fabrics without disrupting the bonding. The compation of the individual plies before bonding was also attempted, however it was unsuccessful in that many of the fabrics employed were of such a light weight construction that they would not hold a significant amount of the compaction. Furthermore, since each of the plies had to be compacted separately, the process costs were considerably increased. A further difficulty was that the shrinkage of the final composite textile fabric was not an average of the shrinkage of the individual plies, but generally the composite fabric had a shrinkage which was uniquely its own. Compacting the plies before shrinkage, therefore still resulted in the final product tending to buckle or pucker.

In co-pending applications Ser. No. 841,042, filed July 11, 1969, and Ser. No. 836,479, filed June 25, 1969, there is a disclosure of a method for improving the dimensional stability of laminated and bonded textile fabrics wherein an uncured to partially cured adhesive is employed to make the starting laminate. This uncured to partially cured laminate is then compacted and fully cured in order to hold the plies in the compacted form. The methods disclosed in the above noted applications are highly effective, but have the disadvantage that the bonding agents had to be cured to lock the fabric in compositied form. Any defects such as undesirable marks, creases, and the like are permanently locked in the compacted fabrics. Furthermore, when making garments from the fully cured composite fabrics made with the cured adhesives, it is difficult, if not impossible, to flatten the fabrics at seams, darts and the like so as to make smooth flat seams and edges in the final garment.

Another difficulty in using the cured adhesives is that in certain fabrics a rather high amount of compaction is desired in order to obtain stretch properties. Because of the rather light construction of certain of the fabrics employed, it was often difficult, if not impossible, to compact the composite fabrics, the amount required in a single pass through the compacter without forming undesirable marks or creases in the goods. Since the bonding agents were uncured to semi-cured, but had to be cured in order to hold the compaction in place, it was only possible to make a single pass through the compacter using the methods of the above noted applications.

It is an object of this invention to provide composite textile fabrics dimensionally stabilized as to laundering or dry cleaning shrinkage.

It is a further object of this invention to provide a method for manufacturing composite textile fabrics dimensionally stabilized as to laundering or dry cleaning shrinkage.

It is still a further object of this invention to provide a highly compacted, bonded, and laminated textile fabric.

SUMMARY OF THE INVENTION

The objects of this invention have been achieved by providing a composite textile fabric wherein the plies are bonded together with a hot melt adhesive which has a softening point above 160° F. and which is flowable and adhesive in an elevated temperature range above 160° F. but below the softening point of decomposition point of the material comprising the plies. The composite textile products of this invention are obtained by initially providing an uncompacted laminate wherein the plies are bonded together with the above described type of adhesive, then heating the laminate to the above described temperature range compacting the composite laminate and then cooling it until the hot melt adhesive solidifies and holds the product in a compacted form.

DESCRIPTION OF THE PREFERRED EMBODIMENTS

Figure 1:
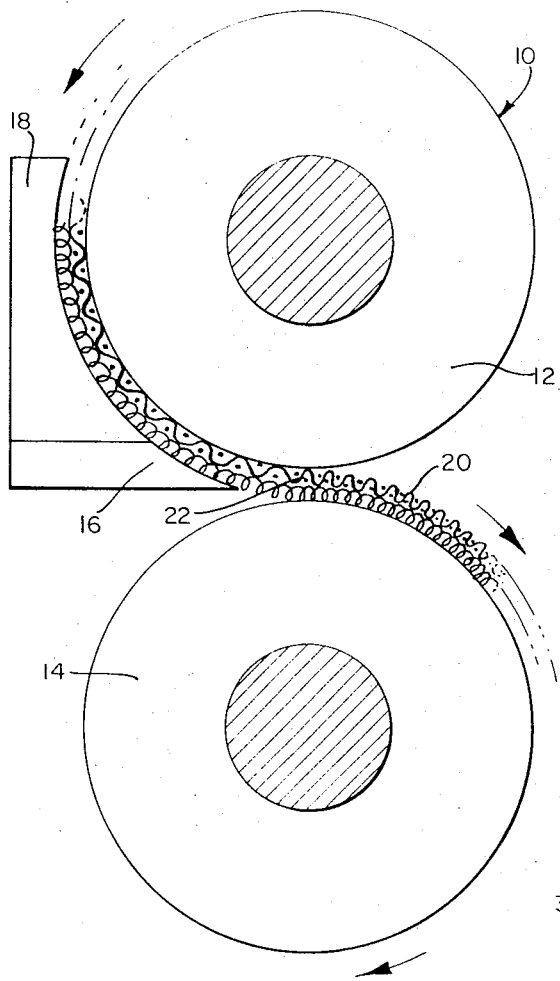
FIG. 1 is a schematic illustration of a compacter through which a composite fabric comprised of a woven fabric and a knitted fabric is shown being compacted.
Figure 2:
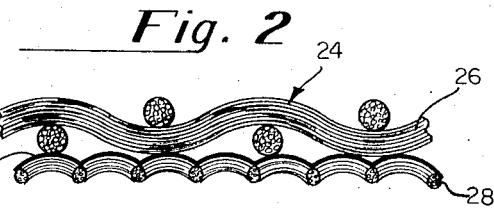
FIG. 2 is an enlarged cross-sectional illustration of an uncompacted bonded textile fabric.
Figure 3:
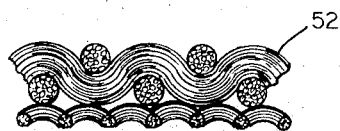
FIG. 3 is an enlarged cross-sectional illustration of a compacted bonded textile fabric.
Figure 4:
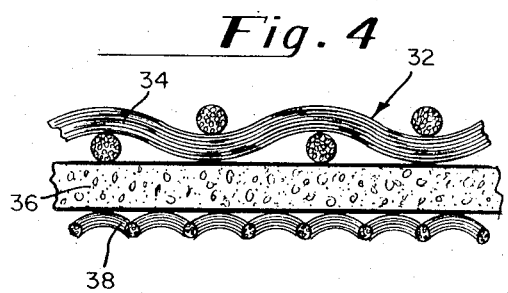
FIG. 4 is an enlarged cross-sectional illustration of an uncompacted laminated textile fabric comprised of a surface ply of a woven fabric, a core ply of foam, and a knitted backing fabric.
Figure 5:
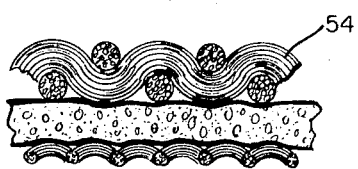
FIG. 5 is an enlarged cross-sectional illustration of a compacted laminated textile fabric comprised of a surface ply of woven fabric, a core ply of foam, and a knitted backing fabric.

Various types of textile fabrics can be employed to make the composite textile fabrics of this invention. The fabrics may be woven, knitted, or of a non-woven construction. The weight of the goods can be widely varied from the relatively light weight fabrics to heavy weight fabrics. The fabrics may be made of natural fibers such as cotton and wool, synthetic fibers such as the polyamides, polyesters, polyolefins and the quasi-synthetics such as cellulose acetate, and viscose rayon. One type of fabric which has proven to be most useful especially as a backing or lining fabric is relatively light weight acetate tricot. This fabric has in the past proven to be somewhat difficult to use in composite textile fabrics because of its relative light weight and loose construction. Furthermore, since cellulose acetate has a relatively low softening point, it has required special precaution in order to avoid fusing the yarns together in treatment.

When making a laminated textile fabric, the non-textile ply may be made of various types of materials. The plies should be in the form of a continuous sheet and should be relatively flexible and compactable. One of the most useful materials for the preparation of a laminated textile fabric are foams such as polyurethane foams. Other materials which may be employed are felts of fibers such as wool, batting of various synthetic fibers and even continuous films of plastic materials may be used as the non-textile material.

The hot melt adhesive that is selected for employment in this invention must have certain characteristics in order to avoid delamination in washing. The hot melt adhesive should have a softening point above 160° F., which is about the maximum temperature reached in home laundering in this country. If, however, it is contemplated that the garments will be commercially laundered or will be sold in countries where home laundering includes a boiling cycle, the softening point of the hot melt adhesive must be above 212° F. In order to have a fabric which is able to be employed in most laundering conditions, it is, of course, preferable that the softening point be above 212° F.

In addition to the softening point requirement, the hot melt adhesive must also become flowable but remain sufficiently adhesive to hold the plies together in an elevated temperature range above the softening point of the adhesive but below the softening or decomposition point of the materials comprising the plies of the composite fabric. The hot melt adhesive must be flowable so that when it is compacted, it will flow and set in a new configuration wherein it will tend to hold the plies in the compacted form. However, it is also important that the hot melt adhesive retain adhesion during the compaction so that it will hold the plies together. The thermoplastic adhesive must also be resistant to water solutions in laundering and solvent solutions in dry cleaning.

Many well known thermoplastic resins exhibit the characteristics required for employment in this invention. They are solid in the lower temperature range and then in an intermediate temperature range they become flowable but also are highly adhesive. Included in this class of thermoplastic resins, are certain well known hot melt adhesives, such as the polyester type, for example, those disclosed by Crowell, U.S. Pat. 3,090,772, the polyolefins, especially the polyethylene, which are readily commercially available having the desired properties, the polyvinyl adhesives, for example, hydroxy vinyl resins like Elvon manufactured by Dupont, polyamide, such as Platamide H manufactured by Docter Plat Corp., Germany and co-polymers of certain thermoplastic resins, for example, the polyethylene vinyl acetate co-polymers, such as Acralene manufactured by Verona Dyestuff Corp. or blends thereof.

In making a compacted bonded fabric, an uncompacted laminate 24 is initially prepared by bonding at least two plies of the fabric together with a hot melt adhesive 30 of the type described above. Various combinations of fabrics can be employed, such as woven fabrics 26, and a knitted fabric 28.

In making a compacted laminated textile fabric, the initial step is the preparation of the uncompacted laminate 32. The uncompacted laminate 32 is comprised of a surface ply 34, which may be a woven fabric, a core ply 36 of a non-textile material such as a foam and advantageously a backing ply 38 made of a material such as a knitted cellulose acetate fabric. The plies 34, 36 and 38 are bonded together with a hot melt adhesive of the type described above.

The plies comprising the uncompacted laminates 24 and 34 may be bonded together using various methods which are well known to those skilled in the art. The hot melt adhesive may be applied to plies in the form of a powder as granules and then heated to a temperature where the hot melt adhesive becomes sufficiently adhesive to hold the plies together. Another method is to use a film, especially a perforated film, of the hot melt adhesive as the bonding layer 30 between the plies and then heating the build-up to a point where the hot melt adhesive melts and holds the plies together. A still further method is to apply the hot melt adhesive to the surface of the plies in the form of a thin web of fibers and then bonding the plies together by heating the hot melt adhesive to its stick point. One further method for making the starting laminates 24 and 32 is to print onto the surface of the plies the hot melt adhesive in molten form and then bring the plies into contact to form the laminate. Other methods may also be used to make the starting laminate.

In order to improve the dimensional stability of the composite fabric so that it will have less than approximately 3% shrinkage and preferably 0% apparent laundering or dry cleaning shrinkage, the starting laminates are compacted an amount sufficient to compensate for the inherent shrinkage of the uncompacted composite fabric.

To determine the inherent shrinkage, the uncompacted laminate is subjected to washing under conditions which will be encountered in actual use. The fabrics should be laundered at least once and preferably 5 to 10 times or more at the temperature recommended for fiber content of the fabrics and which is expected to be encountered in actual use or, if a dry cleanable fabric, it should be subjected to 1 to 3 commercially acceptable dry cleaning cycles. The percent shrinkage that is obtained as a result of the washing or dry cleaning, is considered to be the inherent shrinkage of the uncompacted fabric.

Various types of commercially available compactors can be employed in the process of the present invention. However the type of compactor schematically disclosed in FIG. 1 has proven to be most successful. The compactor 10 is comprised of a feed roll 12, and a retarding roll 14, a fabric indenter 16, and a steam-heated shoe 18. The feed roll 12 is driven so as to have a predetermined peripheral speed. The retarding roll 14 is driven so as to have a peripheral speed which is less than the speed of the feed roll 12. In addition, the surface of the retarding roll 14 is somewhat roughened as by mild etching or metallic spray coating as that it will grip the composite fabric 20 with greater frictional force than the feed roll 12 at the nip 22 of the feed roll 12, and the retarding roll 14. The speed of advancement of the composite fabric 20 is decelerated from the speed of the feed roll 12 to the peripheral speed of the retarding roll 14 because of the greater gripping effect of the retarding roll 14 on the composite fabric 20. The fabric indenter 16 is an elongated bar which extends across the width of the compacter parallel to the nip 22 of the feed roll 12 and the retarding roll 14. The fabric indenter 16 prevents a substantial portion of the compacting forces imparted to the composite fabric 20 by the difference in speeds of the feed roll 12 and the retarding roll 14 from being fed into the section of the composite fabric 20 which is rear-ward of the forward edge of the fabric indenter 16 and the nip 22 is a deceleration zone wherein the compacting of the composite fabrics 20 occurs. The steam-heated shoe 18 is used to heat the composite fabric 20.

Figure 6:
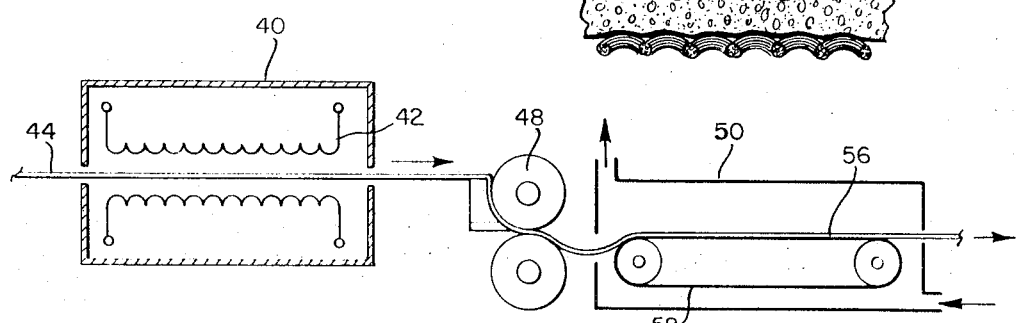
FIG. 6 is a schematic illustration of an apparatus for manufacturing the composite textile fabric of this invention.

The uncompacted laminate whether it is a laminate for the bonded fabric 24, or a laminate for a laminated fabric 32, is compacted in essentially the same manner. The uncompacted laminate 24 and 32 is heated to a temperature range wherein the hot melt adhesive becomes flowable, but retains sufficient adhesion to hold the plies together. This temperature is below the decomposition temperature range or softening point of the materials comprising the plies. If the plies comprising the laminate 24 and 32 are relatively thin, and the adhesive has a relatively low stick temperature, the uncompacted laminate 24 and 32 can be heated by simply bringing it into contact with the heated shoe 18 or by steaming the laminate prior to compacting. However, when a heavy weight fabric is used, or when higher temperatures are required for the hot melt adhesive, it is desirable to pre-heat the uncompacted laminate. A schematic illustration of apparatus suitable for this is disclosed in FIG. 6. This apparatus is comprised of a heating oven 40, containing a suitable heat source 42. The uncompacted laminate 44 is pre-heated in the oven 40 and then fed into the compacter 47 where it is compacted. It is then advanced into a cooling chamber 50 which will be described in more detail below.

The compacted laminate 24 and 32 is compacted as described above which causes the individual plies to be compressed into a mating curved fan folded configuration. Because the hot melt adhesive is also flowable, it is compacted into a new configuration which, when solidified, will hold the laminate in the compacted form.

The compacted laminate is then dried and cooled to a point wherein the hot melt adhesive solidifies and holds the bonded or laminated fabrics in their respective compacted forms 52 and 54. The cooling can be conducted by simply exposing the compacted fabric without tension to air or by feeding the compacted fabric through a cooling chamber 50, in which the compacted composite fabric 56 is supported without tension on suitable means such as a conveyer 58, while the cooling air is circulating about the compacted composite fabric 56. The air is preferably circulated through the cooling chamber 50, counter to the direction of advance of the compacted fabric as indicated by the arrows on FIG. 6. Cooling and other drying means may be employed such as Palmer dryers. Alternatively, the compacted fabric may also be cooled by passing it over a chilled roll.

Using the process of the present invention, employing the hot melt adhesive as the bonding agent, the fabrics can be given several passes through the compacter with the fabrics being compacted a small amount each time. In this way, a highly compacted fabric can be obtained without any substantial danger of creases or undesirable marks forming in the final product.

It is also possible, by this method, to obtain stretch fabrics which can be used for articles such as ski pants and bathing suits by heat setting the compacted laminate when the face fabric is comprised of heat settable fibers.

Another advantage of the fabrics produced by the process of the present invention is when bonded or laminated textile fabrics of this invention are made into a finished article such as garments, the fabrics can be treated in selected areas such as at the seams with a sufficient amount of heat to relax the set of the hot melt adhesive then the fabric can be reset into a new configuration. In this manner, it is possible to obtain flat seams and even form permanent pleats or creases in the garments. Using the fully cured laminated textile products of the prior art when garments were manufactured from these fabrics, the seams tended to be rather puffy and unattractive. Using the process of the present invention, however, it is possible to make seams which are smooth and flat and are undetectable from conventional seams made with conventional fabrics.

It is also possible to produce durable press garments from these fabrics wherein the garment manufacturer can form or reform a garment to modify shape or fit by the use of heat when the garment is pressed or form-fitted.

What is claimed is:

1. The method for the manufacture of a dimensionally stabilized composite textile fabric comprising (a) bonding together two or more plies at least one of which is a textile fabric with a hot melt adhesive having a softening point above 160° F. and which is flowable and adhesive in a temperature range above 160° F. but below the softening point or decomposition point of the materials comprising said plies, to provide uncompacted laminates having an inherent amount of dimensional stability, (b) heating said laminate to a temperature within said temperature range whereby said adhesive becomes flowable but maintains sufficient adhesion to hold the plies together, (c) compacting said laminate an amount sufficient to compensate for at least a substantial portion of the inherent dimensional instability of the uncompacted laminate and (d) cooling said fabric at a temperature below the softening point of said hot melt adhesive, until said hot melt adhesive solidifies and holds the composite fabric in the compacted form.

2. The method according to claim 1 wherein said compacting comprises positively advancing said laminate at a first speed toward a surface traveling at a second slower speed and ultimately carrying said laminate into frictional restrained engagement with said surface, said laminate passing through deceleration zone of a predetermined length immediately prior to engagement with said surface, said first and second speed and predetermined length of said deceleration zone being related so as to cause said laminate to expand in directions normal to and be compacted in the direction of advancement.

3. The method according to claim 1 wherein said softening point of the hot melt adhesive is above 212° F.

4. The method according to claim 1 wherein all of said plies are textile fabrics.

5. The method according to claim 1 wherein at least 1 of said plies is a knitted cellulose acetate fabric.

6. The method according to claim 1 wherein at least 1 of the said plies is a foam.

7. The method according to claim 6 wherein at least 1 of said plies is a knitted cellulose acetate fabric.

8. The method according to claim 1 wherein said hot melt adhesive is a member selected from the group consisting of polyester, polyamides, polyvinyls, polyolefins, and co-polymers, thereof.

9. The method according to claim 1 wherein said fabric is made into a garment and thereafter the compaction is selective, relaxed and reset in a portion of said garment.

References Cited

UNITED STATES PATENTS

| | | | |
|---|---|---|---|
| 3,325,431 | 6/1967 | McManus | 156—332 X |
| 3,449,273 | 6/1969 | Kettenring et al. | 156—331 X |
| 3,474,055 | 10/1969 | Dooley | 156—332 X |
| 3,515,628 | 6/1970 | Jackson et al. | 156—332 X |
| 3,518,142 | 6/1970 | Dooley | 156—332 X |

CARL D. QUARFORTH, Primary Examiner

S. J. LECHERT, Jr., Assistant Examiner

U.S. Cl. X.R.

156—178, 181, 327, 334